Feb. 12, 1963   J. T. ZELLERS, JR   3,077,273
APPARATUS FOR FEEDING GLASS BATCH MATERIALS
Filed Oct. 28, 1957   4 Sheets-Sheet 1

INVENTOR.
BY James T. Zellers, Jr.
Nobbe & Swope
ATTORNEYS

Feb. 12, 1963  J. T. ZELLERS, JR  3,077,273
APPARATUS FOR FEEDING GLASS BATCH MATERIALS
Filed Oct. 28, 1957  4 Sheets-Sheet 2
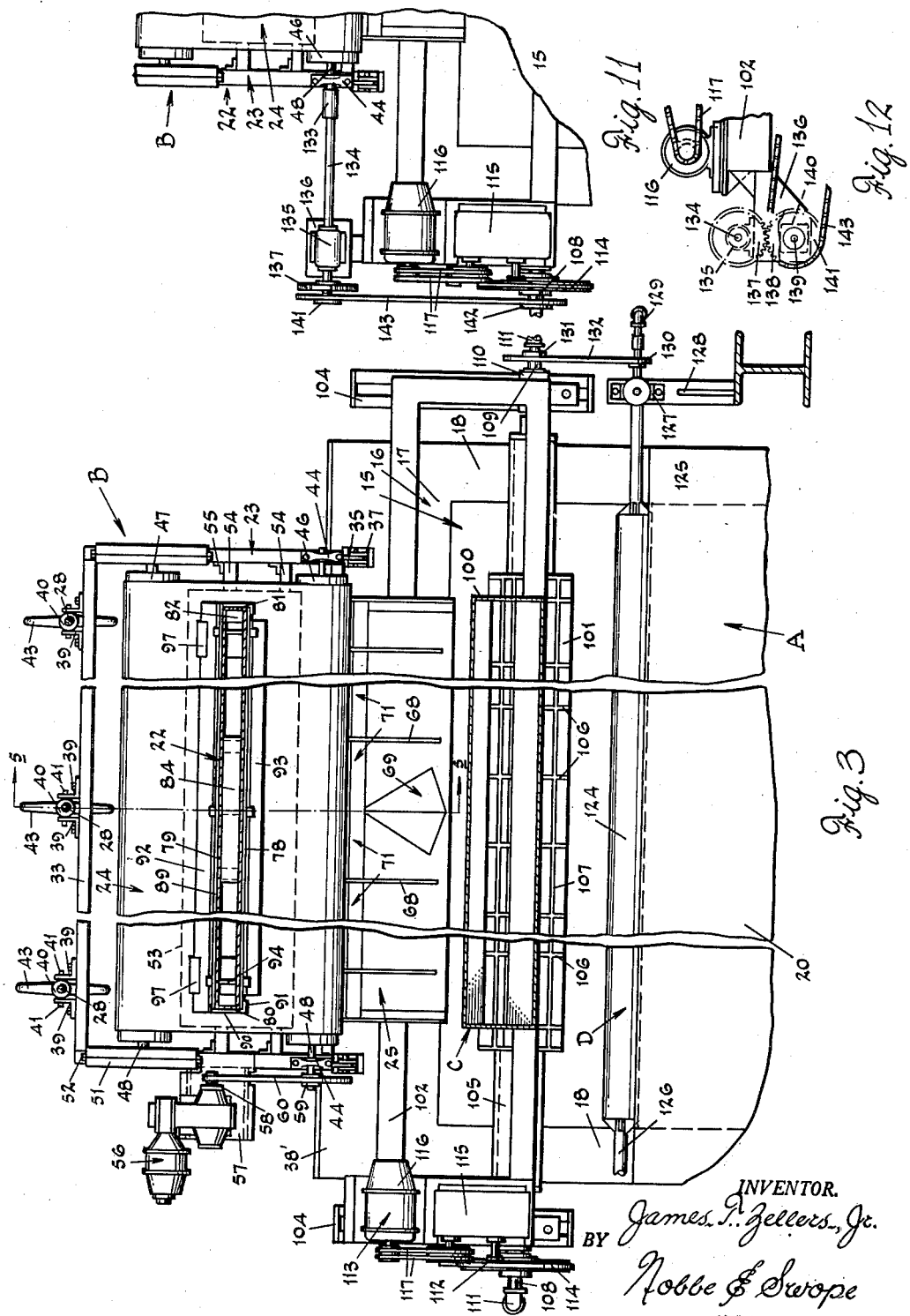
INVENTOR.
James T. Zellers, Jr.
BY
Nobbe & Swope
ATTORNEYS

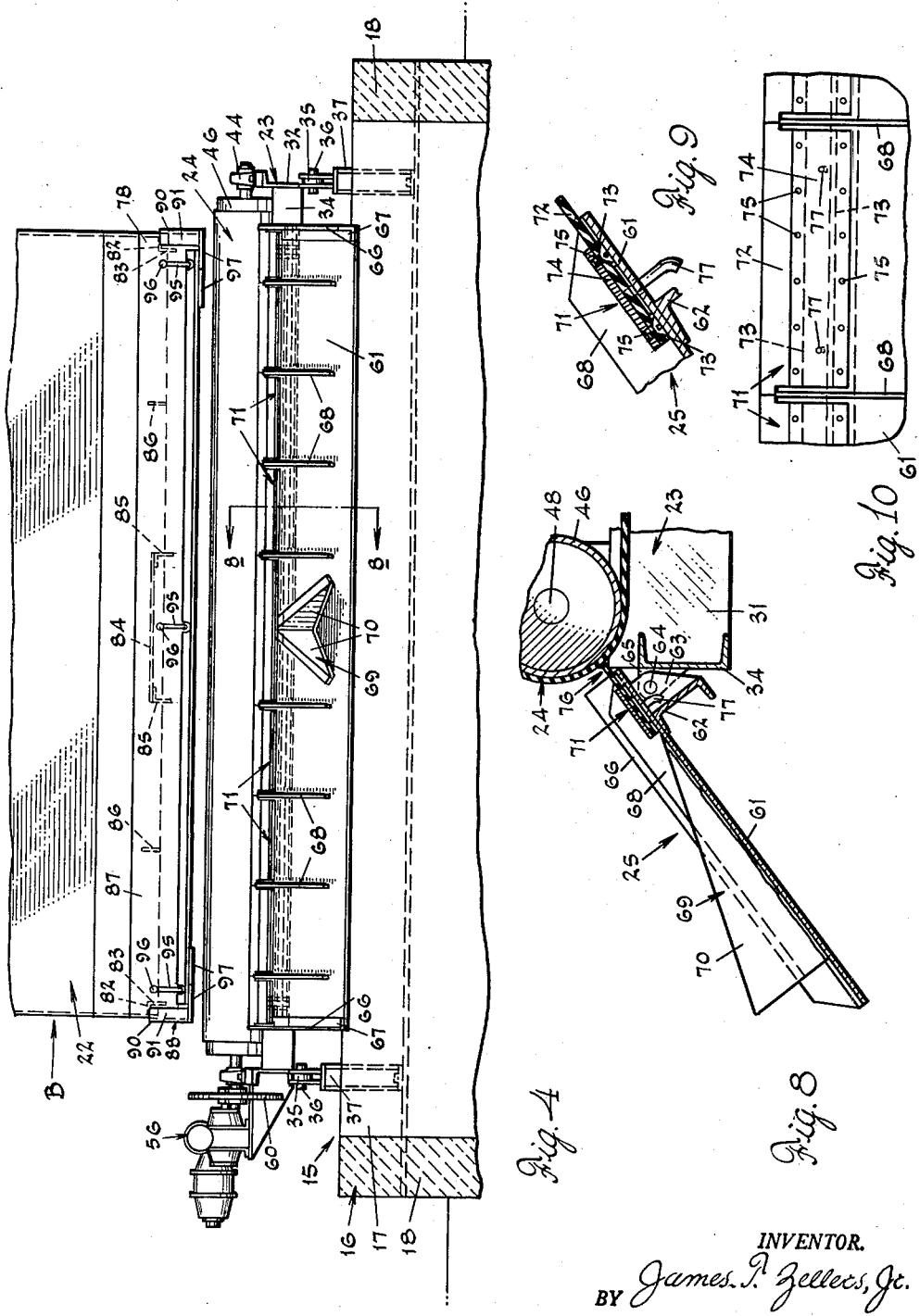

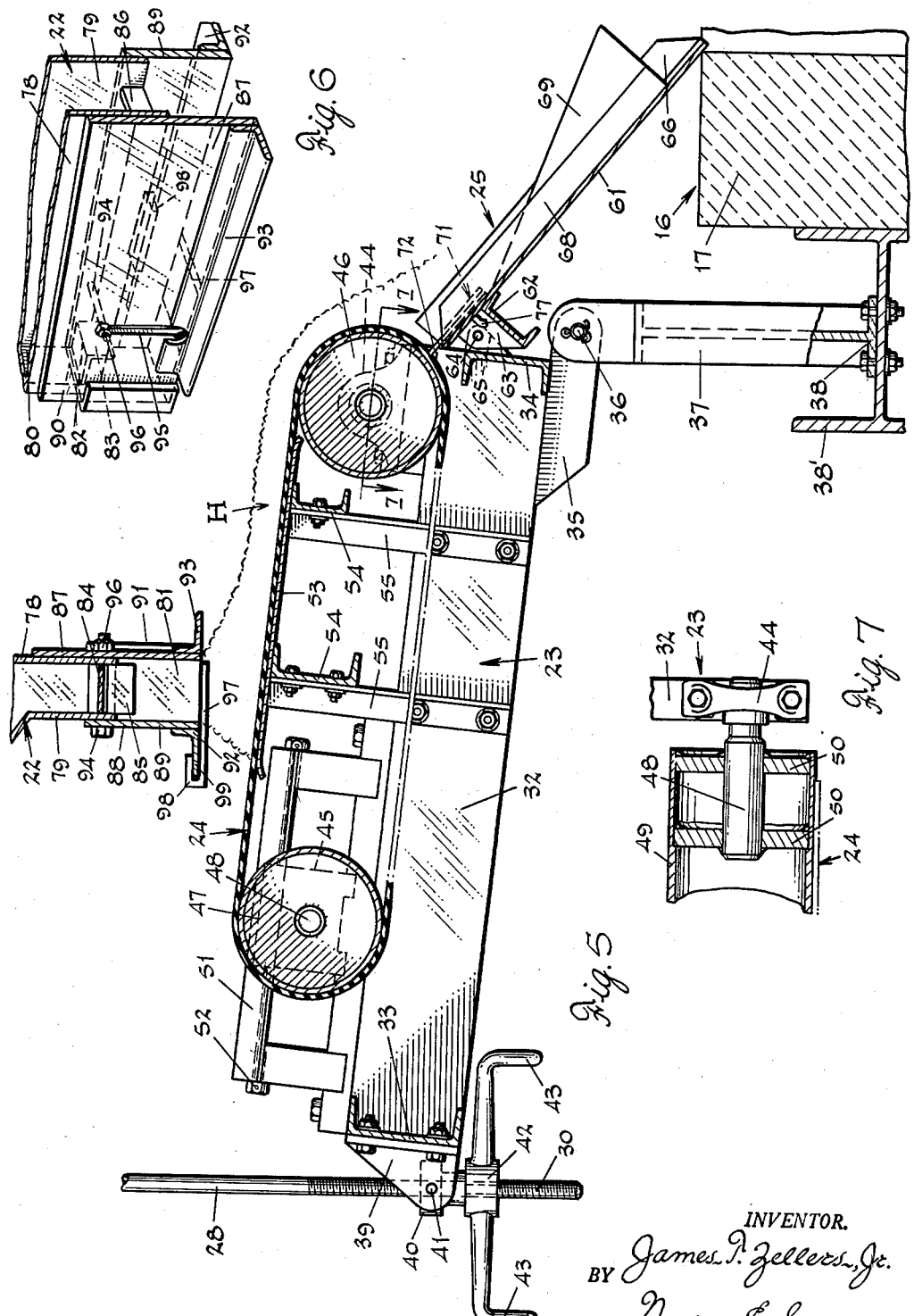

United States Patent Office 3,077,273
Patented Feb. 12, 1963

3,077,273
APPARATUS FOR FEEDING GLASS BATCH MATERIALS
James T. Zellers, Jr., Charleston, W. Va., assignor to Libbey-Owens-Ford Glass Company, Toledo, Ohio, a corporation of Ohio
Filed Oct. 28, 1957, Ser. No. 692,952
7 Claims. (Cl. 214—18)

The present invention relates broadly to the art of glass making and more particularly is concerned with an improved method of and apparatus for feeding glass making materials into a glass-melting tank-furnace.

Generally stated, the materials usually supplied to glass furnaces consist of a mixture of raw pulverulant materials known as batch and a quantity of scrap glass or cullet. These materials may be simultaneously introduced into the furnace at spaced intervals in which case they enter the pool of molten glass within the furnace as islands or huge lump-like masses which gradually melt and merge into the highly heated molten mass. Or the batch and cullet can be supplied, either separately or together, in a substantially continuous manner as a blanket-like layer over the molten glass in the feeding area. The advantage of the latter method is that the materials spread more evenly over the surface of the molten batch and blend more readily therewith as they melt.

The present invention is concerned with this continuous blanket type of feeding and especially with regulating the proportionate rate of supply of the raw batch and cullet materials into the furnace.

In fact the chief aim of the invention is to provide an improved method of and apparatus for accurately controlling the rate at which cullet material is supplied to the tank furnace in proportion to the supply of raw batch materials.

Another object is to provide better distribution of the cullet material as it is moved forwardly to the charging or feeding area of the tank-furnace.

Another object of the invention is the provision of means for adjusting apparatus of the above character to the most efficient operation.

Another object is to provide means for closing off the feeding opening into the furnace while at the same time permitting feeding of glass-making materials in a substantially continuous unobstructed manner.

A still further object of the invention is to provide in an apparatus of the above character improved means for progressively spreading the materials laterally to produce a continuous layer of more equalized thickness over the surface of the molten glass.

Other objects and advantages of the invention will become more apparent during the course of the following description when taken in connection with the accompanying drawings.

In the drawings wherein like numerals are employed to designate like parts throughout the same:

FIG. 3 is a plan view of the apparatus taken along the line 3—3 of FIG. 1;

FIG. 4 is a vertical, transverse cross-sectional view as taken on line 4—4 of FIG. 1;

FIG. 5 is a longitudinal, vertical cross-sectional view as taken on line 5—5 of FIG. 3;

FIG. 6 is a fragmentary perspective view of cullet feeding hopper;

FIG. 7 is a cross-sectional detail view as taken on line 7—7 of FIG. 5;

FIG. 8 is a vertical cross-sectional view through the discharge trough as taken on line 8—8 of FIG. 4;

FIG. 9 is an enlarged detail view of one end of the discharge trough;

FIG. 10 is a fragmentary plan view of the end of the trough shown in FIGS. 8 and 9;

FIG. 11 is a fragmentary plan view of a modified form of drive for the feeding apparatus; and FIG. 12 is a detail view of the modified form of FIG. 11.

Figure 1:
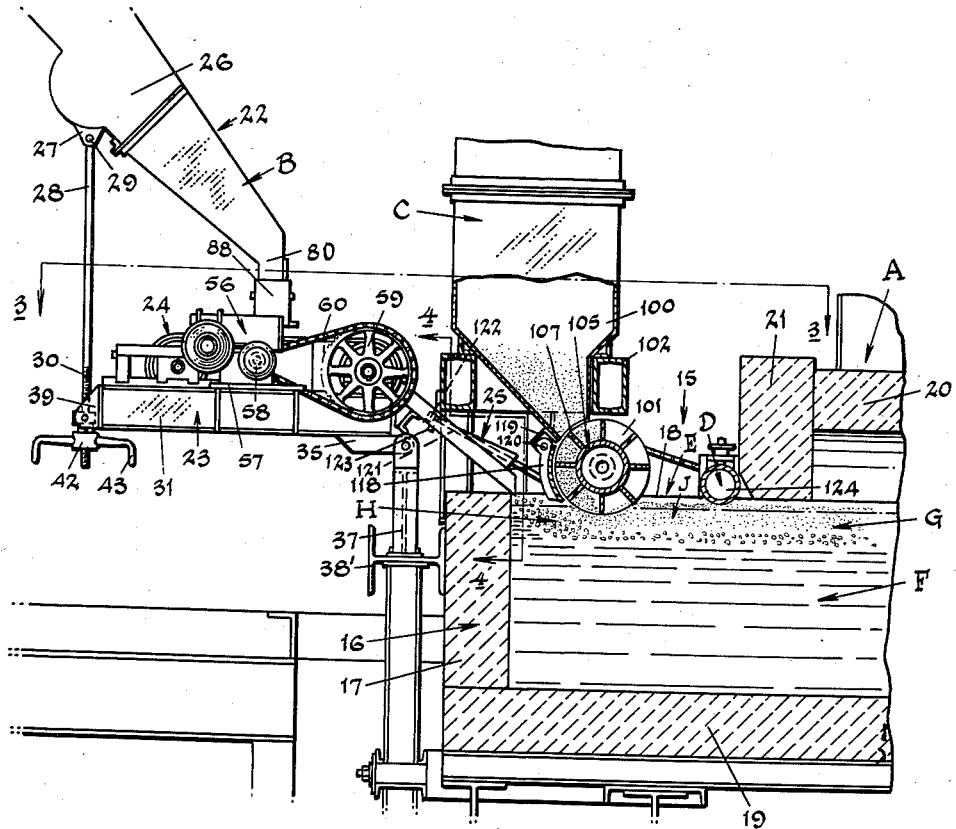
FIG. 1 is a side view, partly in section, of one end of a glass-melting tank-furnace showing a batch-feeding apparatus constructed in accordance with this invention associated herewith.
Figure 2:
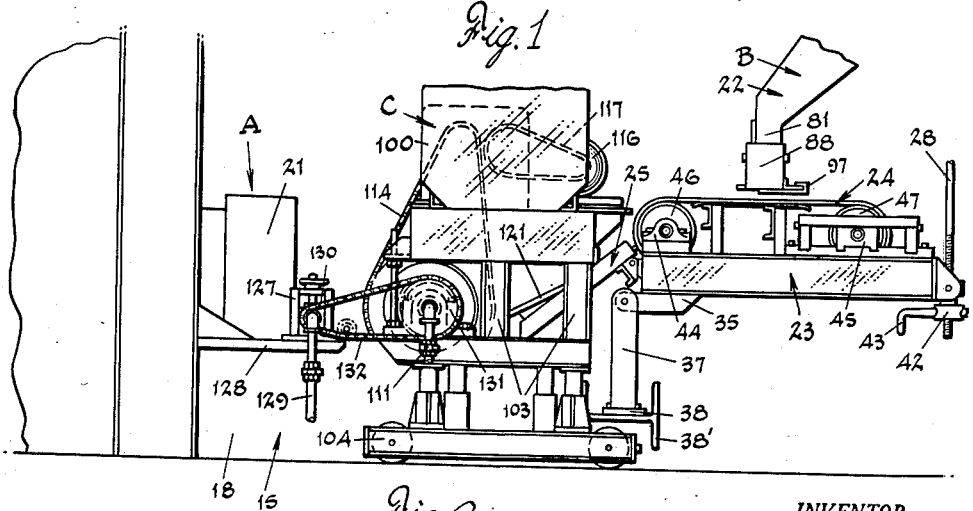
FIG. 2 is an elevational view of the furnace and feeding apparatus viewed from the opposite side.

Referring now more particularly to the drawings, there is shown in FIG. 1 the feeding end of a glass-melting tank-furnace, generally designated by the letter A, and having associated therewith a cullet feeding apparatus, indicated at B, a batch material feeding apparatus C, and a rotary closure member D for the feeding opening.

Conventionally, this entry or feeding end of the tank-furnace A includes the well-known "dog-house" 15 which, for a continuously blanket fed type of furnace is preferably at least half the width of the melting tank and comprises an end wall section 17, side wall portions 18, and a bottom or floor 19. The dog-house 15 is disposed outwardly from the main body of the tank-furnace A and preferably includes a low roofed portion 20 substantially closed to the outside atmosphere at the rear of the furnace by a vertically disposed wall or gate 21. This affords an exposed or open area E into which the batch materials are fed in a substantially continuous manner.

As shown graphically in FIG. 1, the combined discharge from the cullet and batch material feeders, B and C, respectively, is fed onto the pool of molten glass, indicated by the letter F, or more exactly, in the form of a two-strata blanket-like layer G onto the surface of the pool and the forwardly directed propulsion of the layer G gradually carries the materials into the direct influence of the heat sources inside the tank-furnace.

The layer G may be said to be started by the substantially continuous discharge of the glass scrap or cullet H from the feeder B onto the molten glass in the dog house 15. A layer J of the pulverulent batch materials is deposited thereon in an even thickness and the strata cause to progress through the feeding opening beneath the gate 21 and into the low roofed portion of the dog house.

With more specific reference to the cullet feeding apparatus, as illustrated in FIGS. 1, 3 and 5 together with the associated detail views, it will be seen that this comprises a chute, generally designated by the numeral 22; a support frame, by the numeral 23; a power-driven conveyor belt, by the numeral 24; and the discharge trough or pan 25. While not shown in detail, the chute 22 is substantially integrally attached to a rotary vane feeder enclosed within a housing 26 that is generally connected to the source of supply for the cullet material. Also mounted on the housing 26 are a plurality of yokes 27 in which there are received the upper ends of rods 28 by means of pins 29. The rods 28 are threaded as at 30 at their lower ends and are adapted to adjustably support the outwardly disposed end of the support frame 23 in a manner to be more clearly described hereinafter.

The frame 23 as will be seen in FIGS. 3 and 5, is substantially rectangular in plan and is formed by side channel members 31—32 and integrally related end channels 33—34. The side channels 31—32 at the ends adjacent the dog-house 15 are equipped with vertically disposed plates 35 that are pivotally mounted on pins 36 carried in the upper ends of pedestals 37. The pedestals 37 are each provided with a base 38 which is fixedly secured to a horizontally disposed beam 38' forming a part of the furnace frame structure. The end channel 33 carries pairs of angles 39 that are arranged therealong as can best be seen in FIG. 3 of the drawings. Each pair of angles is adapted to pivotally support a collar 40 having diametrically disposed trunnion pins 41. These collars receive the threaded ends of rods 28 which therebeneath carry internally threaded adjusting members 42 having handles 43. By means of the collars 40, the adjacent end of the frame 23 is supported on the adjusting means 42 which, when turned to move upwardly or downwardly along the threaded ends 30 of rods 28, are adapted to change the angular position of the frame with reference to the horizontal plane.

The frame 23 generally supports the conveyor belt 24 and the source of power therefor, in the form of the invention shown in FIGS. 1, 3 and 4. For this purpose, the side frame channels 31—32 are each provided, adjacent front end channel 34, with pillow bearings 44 and, adjacent rear channel 33, with adjustably mounted block bearings 45. The bearings 44 and 45 provide journal supports for the opposite ends of rollers 46—47, each of which is equipped with stub axles 48. One form of assembly for the axles 48 is illustrated in FIG. 7 wherein the tubular roller body 49 will be seen as provided at its opposite ends with pairs of closure discs 50 in which the inner ends of the axles 48 are secured as by welding. The endless conveyor belt 24 is accordingly trained about rollers 46 and 47 and its tension is controlled by the block bearings 45. These bearings are conventionally supported for sliding movements within frames 51 by means of screws 52.

The upper flight of the conveyor belt 24 is supported on a shelf or platform 53 carried by transversely disposed channels 54 that are attached to vertically disposed angles 55 in turn mounted on the side channels 31—32. The platform operates to sustain the belt while it is carrying the cullet material from the chute 22 until it is discharged onto the pan 25.

The belt 24 is power-driven by means of a motor-driven gear unit 56 mounted on a bracket 57 carried by the frame 23. The output shaft of this unit is equipped with a drive sprocket 58 which is coupled to a sprocket 59 by a chain 60 entrained thereabout. The sprocket 59 is keyed to one axle of the roller 46 which is projected outwardly from its associated bearing 44 for this purpose. By adjustment of the power unit 56 in the well-known manner, the speed at which the belt 24 is operated can be increased or decreased and of course this controls the rate of delivery of the cullet material. In fact by control of the power unit 56 as well as the angular plane in which the frame 23 is positioned, the manner of distribution of the cullet across the belt and its rate of regular discharge onto the pan 25 can be established within close limits.

The structure of the trough or pan 25 will be seen in FIGS. 4, 8, 9 and 10 to comprise an elongated, substantially rectangular floor plate 61 which on the undersurface thereof has a fixed channel 62. Adjacent the short sides of the plate 61, and medially therebetween, channel 62 carries yoke members 63 by which the pan bodily is mounted on the support frame 23. Each yoke 63 receives the ends of a pin 64 that is centrally of its length supported in a base 65 attached to the outer surface of channel 34 of said frame. The outer or free end of the pan rests upon the inner corner of the end wall 17 of the dog-house wall 16. The pan 25 accordingly is pivotally supported on the several pins 64 and the plane of its angular position is determined by the relative elevation of the top surface of wall 16 or the end portion 17 thereof.

On the margins of the shorter ends or sides of the plate 61 substantially defining wall portions 66 are provided by angles 67. And equally spaced between the side walls 66 vertically disposed partitioning ribs 68 are fixed to the plate. In the central area of the plate a deflector 69 is located; the deflector having inclined wall surfaces 70 which operate to divert the discharging material from the central area and thus tend to even-out said material. The pan is also provided with freely-movable plates 71 that are adapted to function in the same manner as "doctor blade" and continuously engage the surface of belt 24 to clean the surface thereof.

As more clearly shown in FIGS. 9 and 10, these plates have centrally disposed strips or layers of a flexible material 72, such as relatively thick rubber, that are secured between base bars 73 and cover plates 74. This assemblage is secured together by means of flat-head screws 75 that are regularly spaced between the ends of the bars 73 and 74. As seen in FIG. 10, the bars and plates are shorter than the spacing between the ribs 68 while the extended, freely flexible margins of the strips 72 are slightly longer so as to fit in abutting relation and thus afford a substantially continuous wiping edge as at 76 which is maintained in flexed contact with the surface of the conveyor belt 24.

The plates 71 are mounted on the pan 25 in a substantially freely-movable manner by means of pegs 77 one end of which is fixed, as by welding, in the cover plates 74. The free end of each peg is bent slightly to provide a short "hook" portion. The pegs are received in holes provided in the floor plate 61 of the pan and allow the plates 71, severally and individually, to rise and fall with reference to said floor plate in accordance with the surface condition of the belt 24 or the material dropping therefrom.

It is now believed apparent that cullet material supplied from the housing 26 into the chute 22 will be deposited on the moving conveyor belt 24 and carried forwardly thereon until the belt passes around the roller 46 when the material will be discharged onto the pan 25 and slide downwardly into the open end area E of the dog-house. However, as the material enters the lower reaches of the chute 22, it is controlled in its movement by a valving means which defines its rate of delivery and the covering area it will occupy on the belt 24. For this purpose, the lower end of chute 22 is formed with substantially perpendicular front and rear walls 78—79 and end walls 80—81, FIGS. 5 and 6. At the lower edges of these walls, angles 82 are located between the walls 78—79 and 80 and 78—79 and 81 so that one leg 83 of each angle 82 will be in parallel with the plane of the respective end wall 80 or 81. Medially between the said end walls, there is provided a deflector plate 84 which spans the space between front and rear walls 78—79 and is supported on angles 85 secured to the said walls. If desired, the walls 78—79 can be further secured from outward distension by tie-bars 86 that are equally spaced from and between the angles 82 and 85.

The rate of material discharge is controlled at this lower end of the chute 22 by means of a vertically slidable plate 87 arranged in surface contact with the front chute wall 78 and confined at its opposite ends by means of a frame 88. This frame, as shown in FIG. 6, is substantially rectangular and is formed with a rear wall 89 aligned with chute wall 79, end walls 90 engaged with chute end walls 80—81 and short wall portions 91 aligned with front chute wall 78. End walls 90 are sufficiently longer than the respective end walls 80—81 to enable the ends of the plate 87 to be received between the front wall 78 and the short walls 91 of the frame 88. Preferably the rear wall 89 of the frame is reinforced by an angle 92 while a similar arrangement by means of angle 93 is provided for the plate 87. The plate 87 and frame 88 are more or less suspended at the lower end of the chute 22 by a plurality of bolts 94 and the plate 87 is provided with slots 95 so that it can be moved vertically and secured in adjusted position by nuts 96.

In FIG. 5, it will be seen that by the elevation of the plate 87, the forward fall of cullet from the chute can be accurately controlled by lower edge of the plate. And upon further reference to FIGS. 4 and 6, the width of the deposition on belt 24 will be controlled by end plates 97 carried by the angle 92 of frame 88. These plates have substantially a J-formation and the "hooked" end 98 is slidably engaged on the horizontally disposed leg 99 of angle 92. Preferably the one or more end plates are located in vertical alignment with legs 83 of angles 82 in order that material in the vicinity of chute end walls 80—81 will descend downwardly and inwardly from said angles and upon striking the end plates 97 will spill further inwardly onto the surface of the conveyor belt 24.

An accurate discharging of the cullet material will thus be maintained at the lower end of chute 22 by reason of the angles 82 and deflector 84 since the normal thrust in the central area will be diverted outwardly to establish a substantially even layer transversely of the belt and the width of the layer will be more or less defined by the end plates 97. Additionally, the elevation of plate 87 will gage the actual free fall of the material while the rate of carry-off will be maintained by the speed of belt travel. The natural tendency of the dry material to slide forwardly on the belt can also be accelerated by the inclination of the upper flight of the belt which will be determined by the angularity of the frame 23. This of course is controlled by the hand-nuts 42 on suspended rods 28. This inclined position of the frame as well tends to eliminate any tendency of the cullet to fall rearwardly on the belt but rather move forwardly and downwardly as carried on the belt.

Upon discharge of the cullet from the belt onto the pan 25, it is directed into several aligned paths created by the ribs 68 and again accumulative gathering in the central area is dissipated by the inclined walls 70 of the deflector 69. The cullet material in being supplied to the doghouse is thus discharged in a substantially continuous layer of even thickness. The proportional amount of cullet, determined by the estimated demand of the tank-furnace and the related amount of batch material, may vary within a range of 30 to 35% of the total batch and adjustment of the power output from the gear unit 56 can be modified to drive the belt 24 at the necessary rate of speed.

Now, as the cullet is fed onto the upper stratum of the molten glass F, there is progressively added the raw batch material from the feeding apparatus C. While the specific construction of this apparatus is not the subject of the instant invention, it will be recognized that such equipment includes a hopper 100, that is supplied by suitable reservoirs into which the several constituent parts of the batch are delivered, and a rotary vane wheel 101 adapted to revolve beneath the open lower end of the hopper and move the material downwardly therefrom.

More especially, the hopper 100 is mounted on a substantially rectangular frame 102 carried on vertically disposed posts 103 forming parts of undercarriages 104. The wheel 101 is preferably of the water-cooled type and has a tubular core 105 that on its annular surface is equipped with annular rings 106 and radially disposed ribs 107 which create a plurality of compartments into which the batch material is received from the hopper. The ends of the wheel core 105 are suitably plugged by hollow stub axles 108—109 journaled at their ends in bearings 110 mounted on the under-carriages 104. At the outer end of each axle, fluid connections 111 can be attached in the usual manner, FIG. 3.

Also as shown in this figure, the axle 108 carries a fixed sprocket 112 which is driven from a source of power 113 by means of sprocket chain 114. Power source 113 comprises a reduction unit 115 driven by motor 116 through belts 117 and unit 115 is preferably adapted to be adjusted to the end that power output of units 56 and 115 can be co-related in order that the amount of cullet will be in desired proportion to the amount of raw batch material and the total will form a layer G to be supplied to the melting zone of the tank-furnace in accordance with the production demand.

A further control of the amount of batch material to be discharged from the hopper 100 can be obtained by areas of an arcuately shaped plate 118 that is mounted adjacent the lower end of the hopper by means of brackets 119 and trunnion pins 120. This plate is adapted to vary the amount of batch by its proximate position to the peripheral surface of the wheel 101. For this purpose, adjusting rods 121 are connected to the plate and at their opposite ends are equipped with nuts 122 on opposite sides of supporting brackets 123.

As the layer of combined materials moves forwardly into the tank-furnace, it passes beneath the lower edge of the gate or wall 21 which is elevated from the surface thereof to afford unobstructed clearance. Because the bottom of the gate must be spaced from the moving blanket of glass making materials, there is created an open space between the gate and blanket that is undesirable because cooler atmospheric air can pass therethrough or the regulated furnace temperature can be upset by escape of heated gases.

According to the present invention, however, there is provided the cooled roller D which extends across this open space. The closure member D is positioned closely adjacent the lower edge of the end wall 21 to effectively seal the open space above the batch materials from the ingress of outside, untempered air currents. In fact, when properly adjusted in position, the lower area of the member's periphery substantially rolls along on or very slightly above the surface of the layer G.

The member D may be made up of a tubular roller 124 equipped with hollow stub axles 125—126 that are journaled in bearings 127. The bearings 127 may be suitably mounted on adjustably mounted brackets 128 carried by the furnace structure. As shown at the right-hand end of the roller 124 suitable pipe connections 129 can be attached to the stub axles 125—126 to direct a cooling fluid into and through said roller.

To drive roller 124, the axle 125 is equipped with a sprocket 130 coupled to a sprocket 131 by chain 132. Sprocket 131 is keyed on stub axle 109 of the rotary vane wheel 101. Accordingly the power derived from the unit 115 through chain 114 drives the wheel 101 and transmits power to axle 109 of said wheel and thereby to the roller 124 through chain 132. The roller D accordingly permits the molten glass pool F to be continuously supplemented from the cullet and batch material feeders without undue loss of heat.

In FIGS. 11 and 12, there is shown a modified form of power transmission whereby the source may be unified in one motor and the rate of proportionate feeding of the cullet and raw batch materials determined by the selection of proper gearing. Thus as shown in FIG. 11, one stub axle 48 of the belt roller 46 is provided with a shaft coupling 133, which, if desired, may be in the form of a universal joint and which is connected outwardly to one end of a shaft 134. This shaft is journaled in a bearing 135 mounted on bracket 136 carried by the frame 102 of the batch feeding apparatus C. Outwardly of the bearing 135, the shaft 134 is equipped with a spur gear 137 which is meshed with a similar gear 138 on shaft 139. The shaft 139 is journaled in a bearing 140 mounted on bracket 136 and also has a sprocket 141 keyed thereon. The sprocket 141 is coupled to a sprocket 142 on stub axle 108 by means of a sprocket chain 143 trained thereabout. Accordingly, by determining and/or varying the ratio of the sprockets 141 and 142, or of the spur gears 137 and 138, the conveyor belt 24 will be operated at a proportionate rate of speed to the rotary vane wheel 101 and from the same source of power.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:
1. Apparatus for delivering a layer of glass making materials onto the surface of molten glass at the feeding end of a glass melting furnace and advancing the glass making material into the closed melting furnace portion through a feed opening beneath the lower edge of the rear wall of the furnace comprising, in combination, an endless moving belt, means for providing a continuous supply of glass cullet on said moving belt, a downwardly inclined trough for conveying cullet from said moving belt to the surface of the molten glass, means in the trough for controlling the direction of movement of cullet through said trough to effect transverse distribution of the cullet on the surface of the molten glass, means for depositing a continuous layer of batch materials onto the cullet layer as said cullet layer is carried forwardly on the surface of the molten glass, and a cylindrical closure member mounted for rotary movement adjacent said feed opening whereby the peripheral movement of said closure member adjacent the upper surface of the glass making materials will be in the same direction as the movement of the glass materials moving into said furnace through said feed opening.

2. An apparatus for delivering a layer of glass making materials onto the surface of molten glass as claimed in claim 1, wherein said means for controlling the direction of movement of cullet through the trough includes a deflector means positioned in the central area of said trough and a plurality of vertical partitioning ribs spaced across said trough and extending in the direction of movement of said cullet.

3. An apparatus for delivering a layer of glass making materials onto the surface of molten glass in a glass melting furnace as claimed in claim 2, wherein said means for depositing a continuous layer of batch materials onto the cullet includes a movable surface and said cylindrical rotating closure member is mounted so that the peripheral portion thereof adjacent the glass making materials is in rolling contact with the upper surface of said glass making materials, and including means for driving said endless moving belt, said movable surface and said cylindrical closure member in timed relation to one another.

4. Apparatus for delivering a layer of glass making materials onto the surface of molten glass at the feeding end of a glass melting furnace and advancing said materials forwardly into said furnace comprising, in combination, an endless moving belt, means for providing a continuous supply of glass cullet on said moving belt, said means for providing cullet including a housing containing a supply of cullet, a chute integral with said housing, valve means in said chute to control the rate of discharge of cullet from said chute onto said endless belt, said valve means including perpendicular front and rear chute walls, a pair of chute end walls and a pair of first angles, each said first angle located between one chute end wall and the adjacent front and rear chute walls, each said first angle having one leg parallel with the plane of the adjacent chute end wall, second angles secured to said front and rear chute walls, and a deflector plate supported on said second angles and spanning the space between said front and rear walls, a downwardly inclined trough for conveying cullet from said moving belt to the surface of the molten glass, and means in the trough for controlling the direction of movement of cullet through said trough to effect transverse distribution of the cullet on the surface of the molten glass.

5. An apparatus for delivering a layer of glass making materials onto the surface of a glass melting furnace as claimed in claim 4, wherein said valve means includes control means to determine the area of the belt upon which the cullet will be deposited, said control means including a third angle, one leg of said third angle extending substantially perpendicular to the plane of said chute front and rear walls so that one leg is substantially horizontal with respect to said endless belt, and a plurality of J-shaped plates hooked over and slidably engaged upon said horizontal leg of said third angle.

6. Apparatus for delivering a layer of glass making materials onto the surface of molten glass at the feeding end of a glass melting furnace and advancing said materials forwardly into said furnace comprising, in combination, an endless moving belt, means for providing a continuous supply of glass cullet on said moving belt, said means for providing cullet including a housing containing a supply of cullet, a chute integral with said housing, valve means in said chute to control the rate of discharge of cullet from said chute onto said endless belt, said valve means including perpendicular front and rear chute walls, a pair of chute end walls and a pair of first angles, each said first angle located between one chute end wall and the adjacent front and rear chute walls, each said first angle having one leg parallel with the plane of the adjacent chute end wall, second angles secured to said front and rear chute walls, and a deflector plate supported on said second angles and spanning the space between said front and rear walls, a downwardly inclined trough for conveying cullet from said moving belt to the surface of the molten glass, and means for depositing a continuous layer of batch materials onto the cullet layer as said cullet layer is carried forwardly on the surface of the molten glass.

7. Apparatus for delivering a layer of glass making materials onto the surface of molten glass at the feeding end of a glass melting furnace and advancing said materials into the closed melting furnace portion through a feed opening beneath the lower edge of the rear wall of the furnace comprising, in combination, an endless moving belt, means for providing a continuous supply of glass cullet on said moving belt, a downwardly inclined trough for conveying cullet from said moving belt to the surface of the molten glass, means for depositing a continuous layer of batch materials onto the cullet layer as said cullet layer is carried forwardly on the surface of the molten glass, and a cylindrical closure member mounted for rotary movement adjacent said feed opening whereby the peripheral movement of said closure member adjacent the upper surface of the glass making materials will be in the same direction as the movement of the glass materials moving into said furnace through said feed opening.

References Cited in the file of this patent

UNITED STATES PATENTS

| | | |
|---|---|---|
| 206,047 | Shrake | July 16, 1878 |
| 1,527,747 | Probst | Feb. 24, 1925 |
| 1,918,398 | Johnson | July 18, 1933 |
| 2,114,545 | Slayter | Apr. 19, 1938 |
| 2,175,541 | Probert | Oct. 10, 1939 |
| 2,215,964 | Knowles | Sept. 24, 1940 |
| 2,284,398 | Kutchka | May 26, 1942 |
| 2,306,811 | Kennedy | Dec. 29, 1942 |
| 2,310,924 | Becker | Feb. 16, 1943 |
| 2,624,475 | Henry et al. | Jan. 6, 1953 |
| 2,711,837 | Henry et al. | June 28, 1955 |

FOREIGN PATENTS

| | | |
|---|---|---|
| 521,922 | Belgium | Aug. 31, 1953 |
| 723,422 | Great Britain | Feb. 9, 1955 |